(12) United States Patent
Dugard et al.

(10) Patent No.: US 10,077,078 B2
(45) Date of Patent: Sep. 18, 2018

(54) VEHICLE FRAME

(71) Applicant: Ford Global Technologies, LLC, Dearborn, MI (US)

(72) Inventors: Frederick Ray Dugard, Dearborn Heights, MI (US); John Oliver, Oak Park, MI (US); William P. Gorman, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/384,376

(22) Filed: Dec. 20, 2016

(65) Prior Publication Data

US 2018/0170445 A1 Jun. 21, 2018

(51) Int. Cl.
*B62D 25/06* (2006.01)
*B62D 25/04* (2006.01)
*B62D 27/02* (2006.01)
*B62D 25/02* (2006.01)

(52) U.S. Cl.
CPC ............ *B62D 25/06* (2013.01); *B62D 25/02* (2013.01); *B62D 25/04* (2013.01); *B62D 27/023* (2013.01)

(58) Field of Classification Search
CPC ........ B62D 25/06; B62D 25/04; B62D 25/02; B62D 27/023
See application file for complete search history.

(56) References Cited

U.S. PATENT DOCUMENTS

| | | | |
|---|---|---|---|
| 4,634,173 A | 1/1987 | Aonuma et al. | |
| 5,318,338 A | 6/1994 | Ikeda | |
| 6,578,909 B1 | 6/2003 | Reed et al. | |
| 6,918,628 B2 | 7/2005 | Eipper et al. | |
| 7,950,731 B2 | 5/2011 | Kumagai | |
| 8,973,809 B2 | 3/2015 | Hill et al. | |
| 2016/0107698 A1* | 4/2016 | Oshima | B62D 21/157 296/187.12 |

FOREIGN PATENT DOCUMENTS

DE 102013211576 A1 12/2014

\* cited by examiner

*Primary Examiner* — D Glenn Dayoan
*Assistant Examiner* — Melissa A Black
(74) *Attorney, Agent, or Firm* — Jason C. Rogers; Bejin Bieneman PLC (57) ABSTRACT

A vehicle includes a vehicle frame. The vehicle frame includes two roof rails spaced apart and a rear header elongated along an axis transverse to the roof rails between the roof rails. The rear header includes an upper member and a lower member fixed to each other. The upper member is elongated from a first terminal edge to a second terminal edge. Each terminal edge has a wing and a cutout extending from the wing transverse to the axis.

19 Claims, 7 Drawing Sheets

VEHICLE FRAME

BACKGROUND

A vehicle may have a unibody construction, in which a vehicle frame and a vehicle body are a single component. The vehicle frame supports the other components of the vehicle. The vehicle frame resists static and dynamic forces without undue deflection or distortion, forces such as a weight of other vehicle components, passengers, and cargo; twisting forces caused by uneven surfaces; torque from a transmission; longitudinal and lateral forces from driving; and possibly forces from impacts with other vehicles or impactors.

DETAILED DESCRIPTION

With reference to the Figures, wherein like numerals indicate like parts throughout the several views, a vehicle 30 includes a vehicle frame 32. The vehicle frame 32 includes two roof rails 34 spaced apart and a rear header 36 elongated along an axis A transverse to the roof rails 34 between the roof rails 34. The rear header 36 includes an upper member 38 and a lower member 40 fixed to each other. The upper member 38 is elongated from a first terminal edge 42 to a second terminal edge 44. (The adjectives "first" and "second" are used throughout this document as identifiers and are not intended to signify importance or order.) Each terminal edge 42, 44 has a wing 46 and a cutout 48 extending from the wing 46 transverse to the axis A.

The cutouts 48 of the upper member 38 provide access for welding the lower member 40 to other components, such as supports 68 of the vehicle frame 32, which may reduce manufacturing complexity and/or expense. Welds between the lower member 40 and other components, e.g., the supports 68, may thus be more secure. The cutouts 48 further reduce stack-up of component thicknesses, which may reduce a need to fill in gaps between components with measures such as tape. The cutouts 48 of the upper member 38 may reduce material costs. Finally, the design of the rear header 36 may allow the rear header 36 to be used across different vehicle models or variants of a vehicle model.

Figure 1:
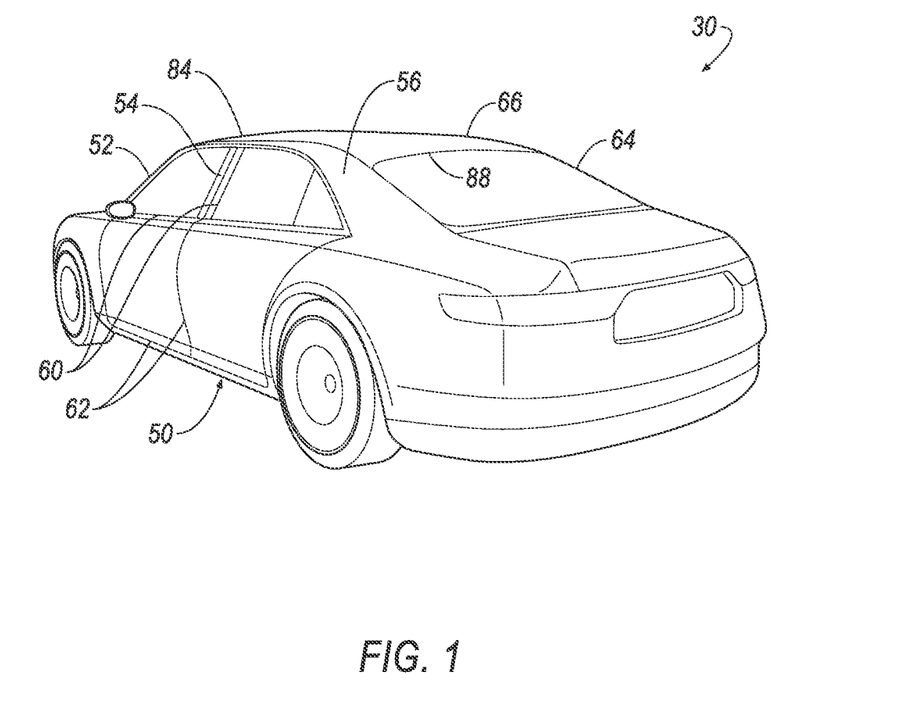
FIG. 1 is a rear perspective view of a vehicle.

With reference to FIG. 1, the vehicle 30 includes the vehicle frame 32. The vehicle 30 may be of a unibody construction, in which the vehicle frame 32 and a body 50 of the vehicle 30 are a single component. The vehicle 30 may, alternatively, be of a body-on-frame construction, in which the vehicle frame 32 supports the body 50 that is a separate component from the vehicle frame 32. The vehicle frame 32 may be formed of any suitable material, for example, steel, aluminum, etc.

Figure 2:
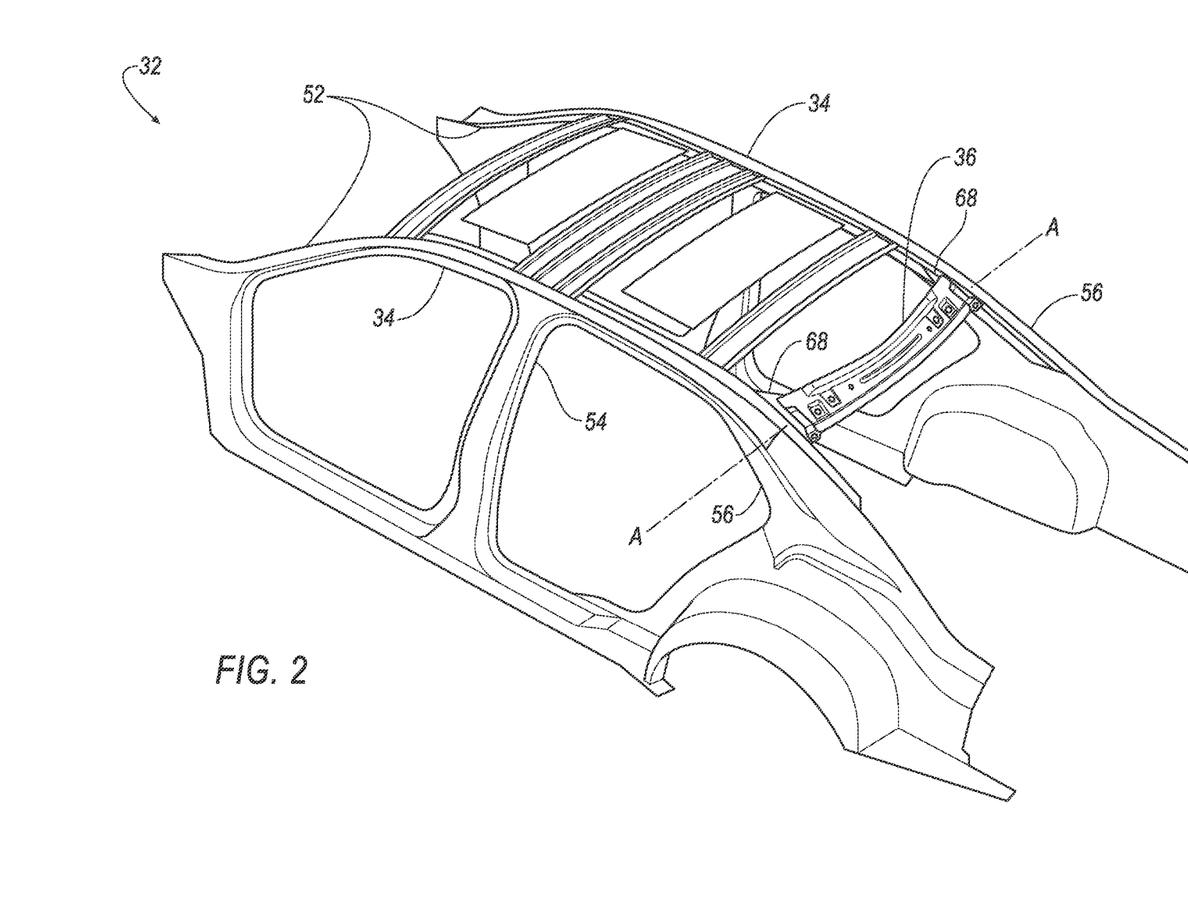
FIG. 2 is a rear perspective view of a vehicle frame of the vehicle.

With reference to FIG. 2, the vehicle frame 32 may include A pillars 52, B pillars 54, C pillars 56, and the roof rails 34. The A pillars 52 may extend between a windshield (not shown) and windows 60. The B pillars 54 may extend between the windows 60 of adjacent doors 62. The C pillars 56 may extend between the windows 60 and a backlite 64. The vehicle frame 32 may also include D pillars (not shown) if the vehicle 30 is, e.g., an SUV, crossover, minivan, or station wagon, in which case the C pillars 56 extend between the windows 60 of rear doors 62 and rear left and right windows (not shown), and the D pillars extend between the rear right and left windows and the backlite 64.

Each roof rail 34 may include and extend between one A pillar 52 and one C pillar 56. The two roof rails 34 may be spaced apart. Specifically, the roof rails 34 may be located on a vehicle-right side and a vehicle-left side of a roof panel 66, respectively.

Figure 4:
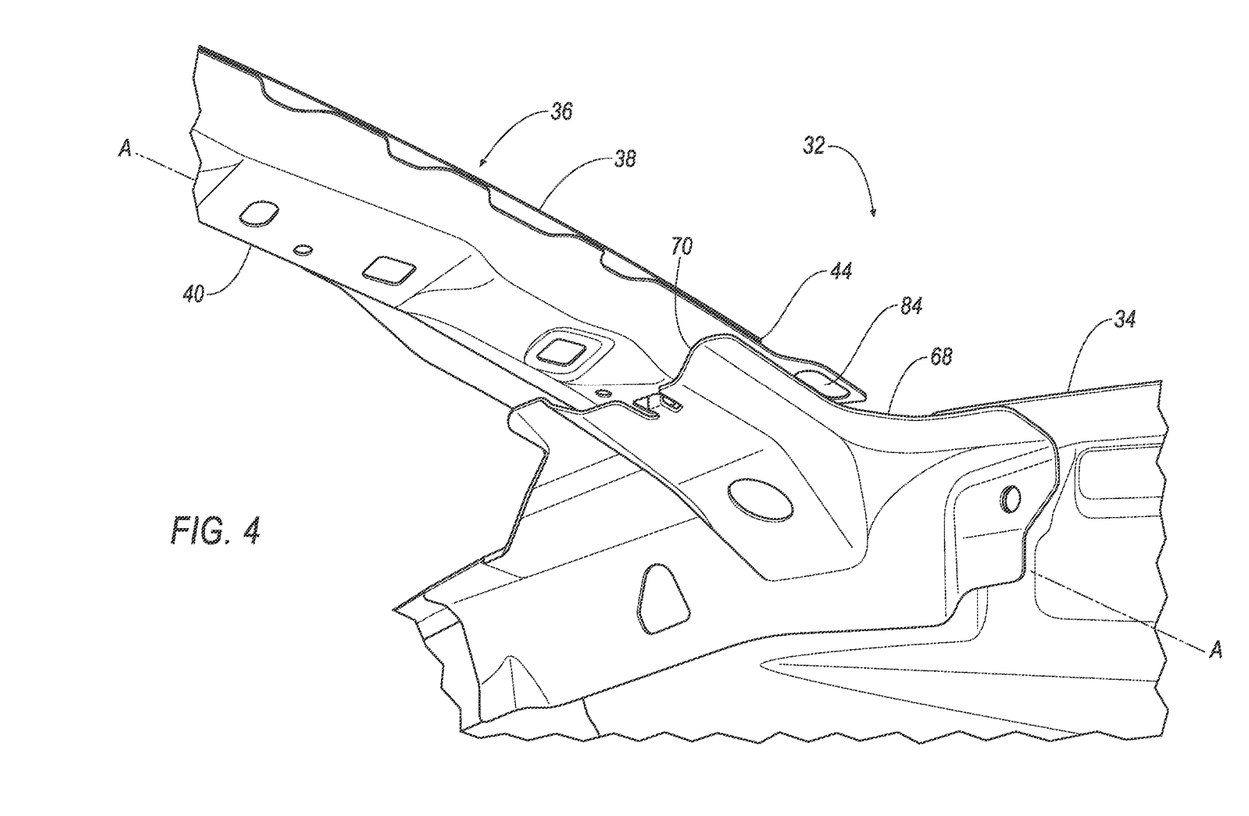
FIG. 4 is a bottom perspective view of a portion of the vehicle frame.

With reference to FIG. 4, the vehicle frame 32 includes the supports 68 extending from the roof rails 34 between the roof rails 34. The supports 68 may be welded to the roof rails 34, specifically to an underside of the roof rails 34. Each support 68 may include a cradle 70 adjacent to the lower member 40; that is, nothing is between the cradle 70 and the lower member 40. The cradle 70 may be shaped to extend partially around the lower member 40. The supports 68 may fix the rear header 36 relative to the roof rails 34.

Figure 3:
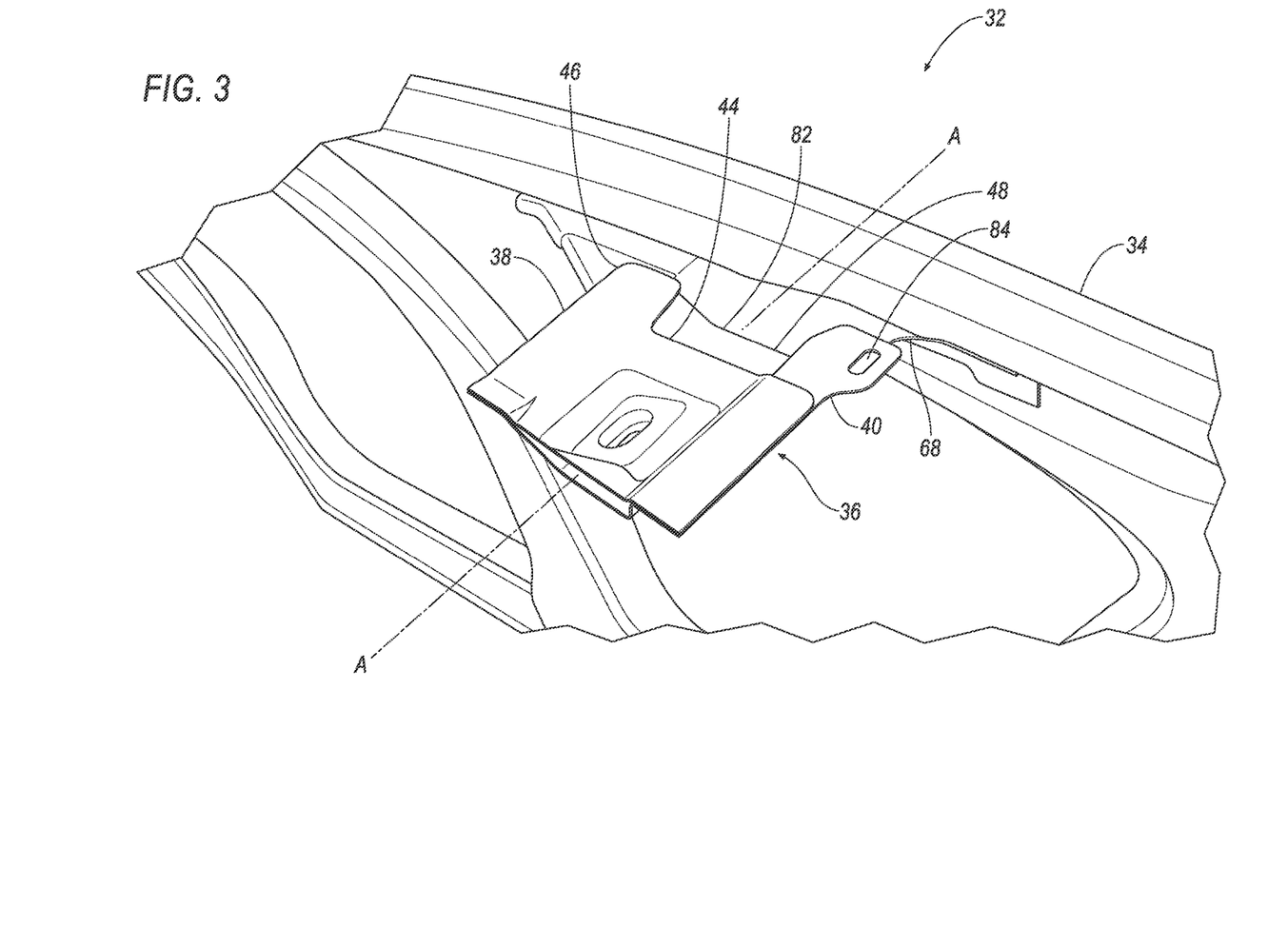
FIG. 3 is a top perspective view of a portion of the vehicle frame including a rear header cut off for illustrative purposes.
Figure 5:
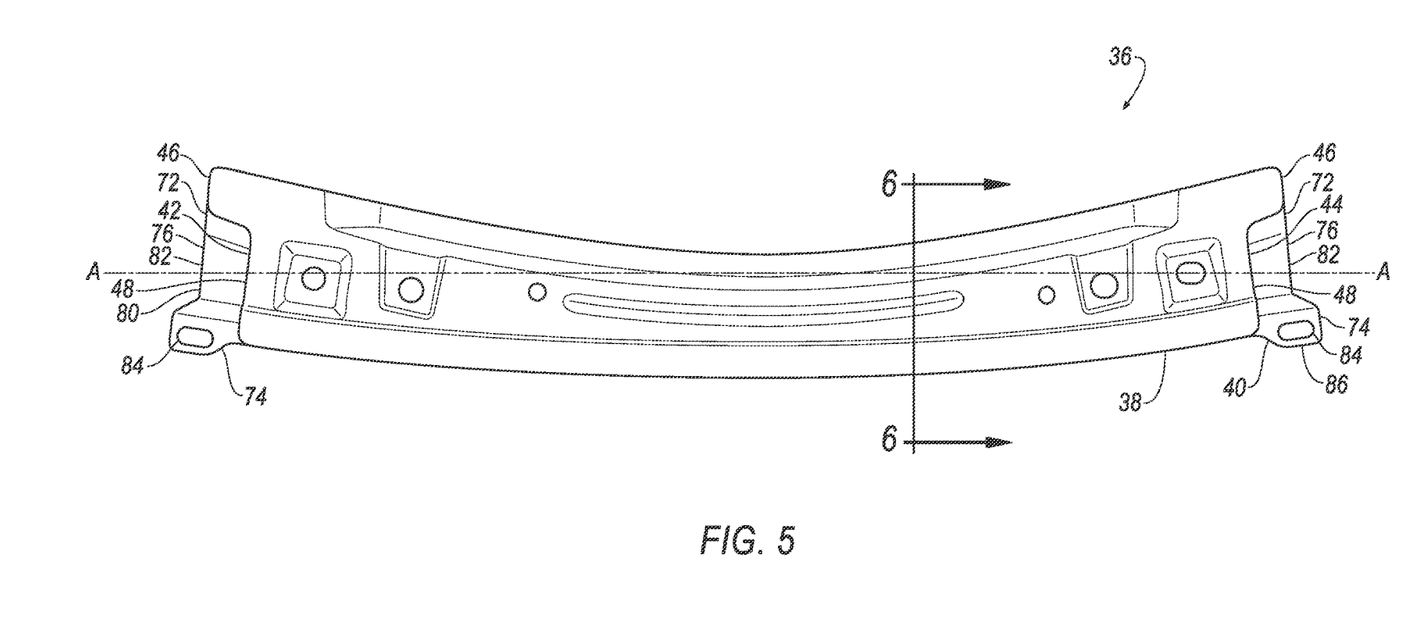
FIG. 5 is a top view of the rear header of the vehicle frame.

With reference to FIGS. 2, 3, and 5, the rear header 36 may be elongated along the axis A transverse to the roof rails 34 between the roof rails 34. The rear header 36 includes the upper member 38 and the lower member 40 fixed to each other.

With reference to FIGS. 3 and 5, the upper member 38 is elongated from the first terminal edge 42 to the second terminal edge 44. The upper member 38 is elongated along the axis A transverse to the roof rails 34. The upper member 38 is disposed between the roof rails 34. The upper member 38 may be spaced from the roof rails 34; that is, the terminal edges 42, 44 of the upper member 38 may not touch the roof rails 34.

With reference to FIG. 5, each terminal edge 42, 44 of the upper member 38 has the wing 46 and the cutout 48 extending from the wing 46 transverse to the axis A, in other words, along a direction transverse to the axis A. Specifically, the cutout 48 may extend from the wing 46 in a vehicle-rearward direction, that is, in a direction toward the backlite 64. The terminal edges 42, 44 of the upper member 38 may be spaced from the roof rails 34. The wing 46 of the upper member 38 abuts and is fixed to the lower member 40.

With reference to FIGS. 4 and 5, the lower member 40 is elongated along the axis A transverse to the roof rails 34 between the roof rails 34. The lower member 40 may be spaced from the roof rails 34. The lower member 40 may extend from one support 68 to the other support 68. The lower member 40 extends from the first terminal edge 42 to the second terminal edge 44 of the upper member 38. The lower member 40 may be disposed between the cradle 70 of the support 68 and the upper member 38.

Figure 6:
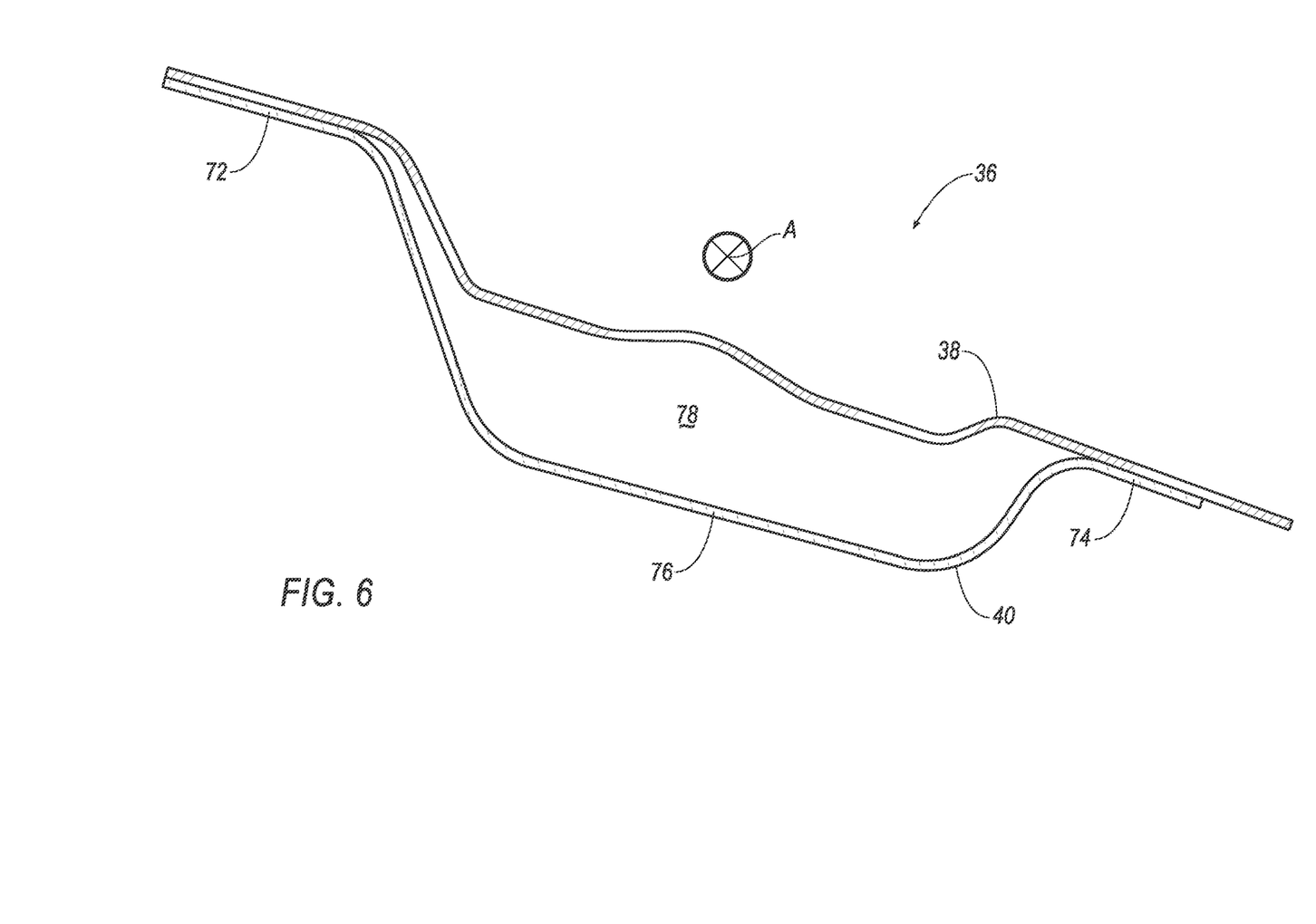
FIG. 6 is a cross-sectional view of the rear header.

With reference to FIG. 6, the lower member 40 may include a first platform 72 and a second platform 74 elongated along the axis A and a depression 76 between the first platform 72 and the second platform 74. The first platform 72 may be on a vehicle-forward side of the lower member 40, farther from the backlite 64, and the second platform 74 may be on a vehicle-rearward side of the lower member 40, nearer the backlite 64. The depression 76 may recess a portion of the lower member 40 between the first platform 72 and the second platform 74.

The upper member 38 and the lower member 40 may define a cavity 78 elongated along the axis A from the first terminal edge 42 to the second terminal edge 44. The upper member 38 may extend from the first platform 72 to the second platform 74 of the lower member 40 to define the cavity 78 from the first terminal edge 42 to the second terminal edge 44. The upper member 38 and the lower member 40 may together form a tube shape around the cavity 78.

With reference to FIGS. 3 and 5, the lower member 40 includes end portions 80. The end portions 80 of the lower member 40 are disposed at the terminal edges 42, 44 of the upper member 38. The lower member 40, specifically the end portions 80 of the lower member 40, extend along the cutouts 48 in a direction along the axis A, as shown in FIG. 5.

The lower member 40, specifically the end portions 80 of the lower member 40, may include weld flanges 82 aligned with the cutouts 48 in the axis A. Specifically, the weld flanges 82 may be aligned with the cutouts 48 in a direction transverse to both the axis A and the roof rails 34. The weld flanges 82 may be welded to the supports 68.

With continued reference to FIGS. 3 and 5, the lower member 40, specifically the end portions 80 of the lower member 40, may include holes 84 at the cutouts 48 of the upper member 38, specifically one hole 84 at each cutout 48. The holes 84 may be aligned with the cutouts 48 along the axis A. Specifically, the holes 84 may be aligned with the cutouts 48 in a direction transverse to both the axis A and the roof rails 34. The holes 84 may be elongated, specifically elongated along the axis A.

Figure 7:
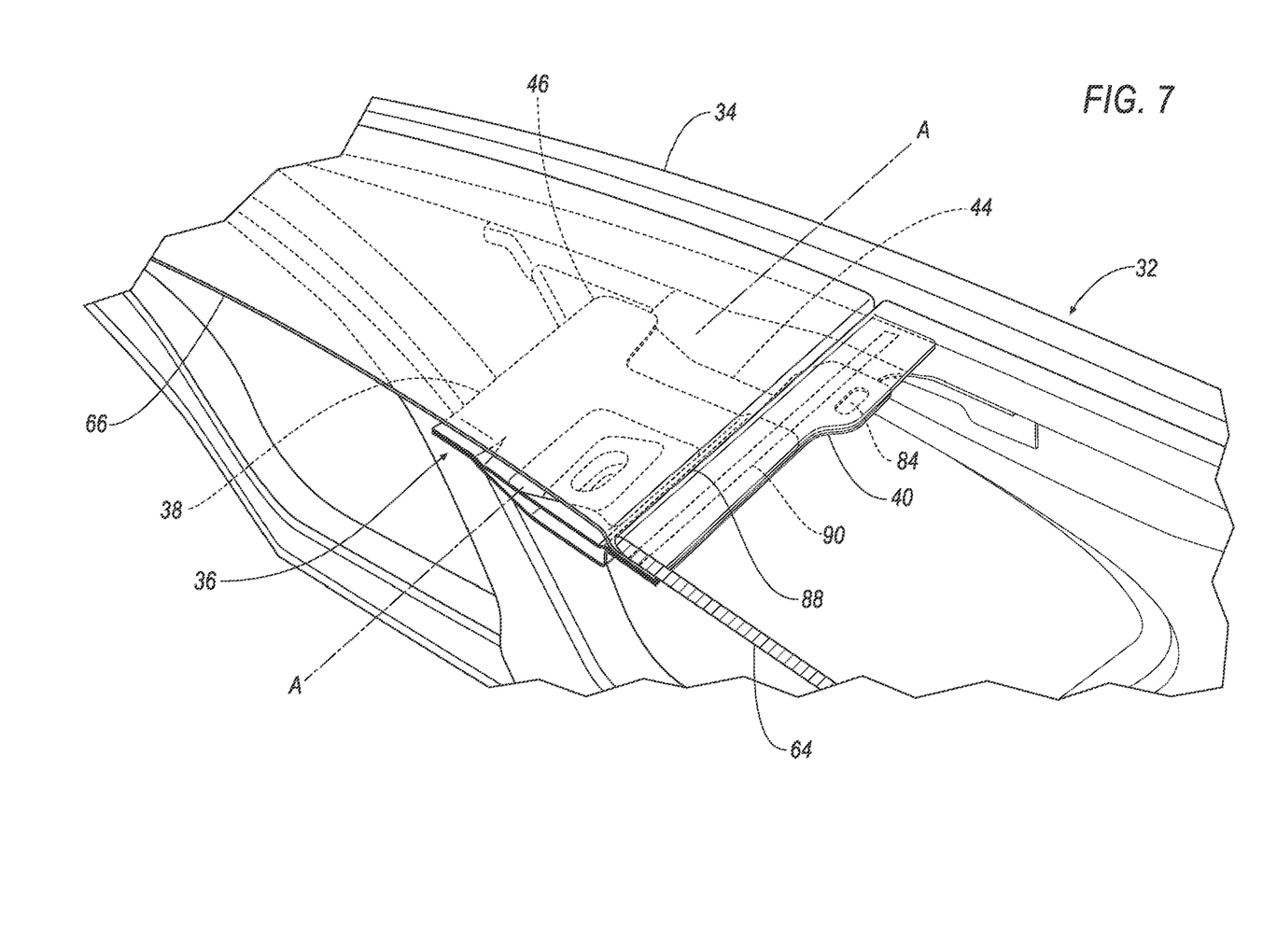
FIG. 7 is a top perspective view of a portion of the vehicle frame including the rear header, a roof panel, and a backlite cut off for illustrative purposes.

With reference to FIGS. 1 and 7, the roof panel 66 may extend between the roof rails 34 and may extend from a front end 86 to a rear end 88 attached to the upper member 38. The roof panel 66 may extend from one roof rail 34 to the other roof rail 34. The roof panel 66 may be generally shaped as a rectangular sheet. The rear header 36 may be disposed at the rear end 88, that is, at a vehicle-rearward end or an end closer to the backlite 64, of the roof panel 66.

With reference to FIG. 7, an adhesive strip 90 may extend between the roof panel 66 and the upper member 38 and between the roof panel 66 and the lower member 40 at the cutouts 48. The adhesive strip 90 may also extend between the roof panel 66 and the supports 68. The adhesive strip 90 may attach the roof panel 66 to the rear header 36 and to the supports 68. The adhesive strip 90 may fill in gaps between the roof panel 66 and upper member 38, lower member 40, and supports 68 caused by thickness stacking among the upper member 38, lower member 40, and supports 68. The adhesive strip 90 may be formed of, e.g., urethane.

The backlite 64 may extend between the roof rails 34, specifically between the C pillars 56, and the backlite 64 may also extend from the rear end 88 of the roof panel 66 away from the roof panel 66. The backlite 64 may be formed of any suitably durable transparent material, including glass such as laminated, tempered glass or plastic such as Plexiglas or polycarbonate.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle frame comprising:
two roof rails spaced apart; and
a rear header elongated along an axis transverse to the roof rails between the roof rails, the rear header including an upper member and a lower member fixed to each other;
the upper member being elongated from a first terminal edge to a second terminal edge, each terminal edge having a wing and a cutout extending from the wing transverse to the axis;
wherein the terminal edges are spaced along the axis away from the roof rails.

2. The vehicle frame of claim 1, wherein the lower member extends from the first terminal edge to the second terminal edge of the upper member.

3. The vehicle frame of claim 1, wherein the lower member extends along the cutouts in a direction along the axis.

4. The vehicle frame of claim 3, wherein the lower member includes a hole at one of the cutouts of the upper member.

5. The vehicle frame of claim 4, wherein the hole is elongated.

6. The vehicle frame of claim 1, wherein the wings abut and are fixed to the lower member, and wherein the lower member includes weld flanges aligned with the cutouts in the axis.

7. The vehicle frame of claim 6, further comprising supports extending from the roof rails between the roof rails, wherein the lower member extends from one support to the other support, and wherein the weld flanges are welded to the supports.

8. The vehicle frame of claim 7, wherein the supports are welded to the roof rails.

9. The vehicle frame of claim 7, wherein each support includes a cradle adjacent to the lower member, wherein the lower member is between the cradle and the upper member.

10. The vehicle frame of claim 1, wherein the wing of the upper member abuts and is fixed to the lower member.

11. The vehicle frame of claim 1, wherein the upper member and lower member define a cavity elongated along the axis from the first terminal edge to the second terminal edge.

12. The vehicle frame of claim 1, wherein the cutouts are elongated along a direction transverse to the axis.

13. The vehicle frame of claim 12, wherein the lower member includes holes aligned with the cutouts along the axis, wherein the holes are elongated along the axis.

14. A vehicle comprising:
two roof rails spaced apart;
a rear header elongated along an axis transverse to the roof rails between the roof rails, the rear header including an upper member and a lower member fixed to each other, the upper member being elongated from a first terminal edge to a second terminal edge, each terminal edge having a wing and a cutout extending from the wing transverse to the axis; and
a roof panel extending between the roof rails and extending from a front end to a rear end attached to the upper member at the upper member.

15. The vehicle of claim 14, further comprising an adhesive strip extending between the roof panel and the upper member and between the roof panel and the lower member at the cutouts.

16. The vehicle of claim 15, wherein the terminal edges of the upper member are spaced along the axis away from the roof rails.

17. The vehicle of claim 16, further comprising supports extending from the roof rails between the roof rails, wherein the lower member extends from one support to the other support.

18. The vehicle of claim 17, wherein the adhesive strip extends between the roof panel and the supports.

19. The vehicle of claim 14, further comprising a backlite extending between the roof rails and extending from the rear end of the roof panel away from the roof panel.

\* \* \* \* \*